United States Patent [19]

Jansen et al.

[11] Patent Number: 4,945,526
[45] Date of Patent: Jul. 31, 1990

[54] ACTUATOR ASSEMBLY FOR OPTICAL DISK SYSTEMS

[75] Inventors: Gerardus L. M. Jansen, Cascade; Leonardus J. Grassens, Colorado Springs; Zdenek T. Hollen, N. Colorado Springs, all of Colo.

[73] Assignee: Laser Magnetic Storage International Company, Colorado Springs, Colo.

[21] Appl. No.: 259,129

[22] Filed: Oct. 18, 1988

[51] Int. Cl.$^5$ ............................................... G11B 7/00
[52] U.S. Cl. .................................................. 369/44.11
[58] Field of Search ...................... 369/43–47; 358/342; 250/201 DF

[56] References Cited

U.S. PATENT DOCUMENTS

| | | | |
|---|---|---|---|
| 4,012,778 | 3/1972 | Johnson | 360/78.12 |
| 4,414,657 | 11/1983 | Arquie et al. | 369/45 |
| 4,427,905 | 1/1984 | Sutton | 310/13 |
| 4,443,721 | 4/1984 | Jansen | 310/14 |
| 4,545,046 | 10/1985 | Jansen et al. | 369/111 |
| 4,607,913 | 8/1986 | Jansen | 350/247 |
| 4,646,182 | 2/1987 | Sakurai | 360/104 |
| 4,862,441 | 8/1989 | Yumura et al. | 369/45 |

Primary Examiner—Robert L. Richardson
Attorney, Agent, or Firm—Sheridan, Ross & McIntosh

[57] ABSTRACT

An actuator assembly for use in an optical disk information processing system is disclosed having improved performance characteristics for achieving a large radial movement frequency bandwidth. The actuator assembly includes an actuator body defining a rail channel for movement on a single rail. The device is configured so that the center of mass of the actuator body is above the friction surfaces between the rail and the rail channel. The actuator body includes an optical channel for receiving an optical beam to be focused on an optical disk. This optical channel is positioned between two focus supports which support a lens holder which is movable for focusing the incoming optical beam onto the optical disk. The focusing motor, including a coil and focusing magnets, is positioned below the center of mass of the actuator to achieve a balanced device. The radial drive assembly for the device includes a coil directly wound on the actuator body which encircles the optical channel and the rail channel. Stationary magnets are positioned on either side of the actuator to create magnetic fields for interaction with a magnetic field created by electro-magnetic induction through the radial coil. The present device is configured to impart a radial force on the actuator body which either substantially coincides with the center of mass of the actuator assembly or is displaced from the center of mass in the direction of the focusing lens.

23 Claims, 9 Drawing Sheets

ACTUATOR ASSEMBLY FOR OPTICAL DISK SYSTEMS

FIELD OF THE INVENTION

The present invention relates to writing and/or reading on optical disks. More particularly, the present invention involves an improved actuator assembly for transporting a focusing apparatus radially with respect to a rotating optical disk for reading or writing radiation spot information on the disk.

BACKGROUND INFORMATION

Optical disk systems for storing and reading information are known. The information is stored on a disk by causing a mark or deformation on the disk with a laser. To read the information from the disk, a laser beam at low power is positioned and focused on a disk and reflectance from the disk is read. Typically, for positioning the laser at various locations on the disk, the disk is rotated and a radial actuator assembly is translated along a radius of the disk.

Similar positioning assemblies are known for magnetic disk systems. Such systems differ essentially in that information is stored in a magnetic form rather than an optical form. Typically, the magnetic disk is rotated and an assembly is translated in a radial direction. In at least some respects, positioning methods are different for optical disks. Typically, bit sizes are smaller for optical disks, and therefore actuator response frequencies must be higher. Both magnetic and optical disks typically contain information in discrete, spiral or concentric circular tracks on the disks. Most optical disks have spiral tracks. To read information at a particular location, an assembly must be positioned directly in line with the correct portion of the track. The disk is also rotated so that the information within the given track is positioned over the actuator assembly.

The width of a track in a typical magnetic floppy disk is on the order of 200 microns. The track within a magnetic hard disk is typically on the order of 10 microns. Optical disks have a track width on the order of 1.5 microns. Accordingly, the radial positioning accuracy for optical disk carriages required to obtain correct reading of information is greater than that required for magnetic disk systems.

Numerous carriage actuator apparatuses for magnetic disk systems are known. For example, U.S. Pat. No. 4,012,778 to Johnson (Mar. 15, 1977), discusses a linear actuator which translates magnetic assemblies by means of a drive shaft and two rollers. Each assembly is supported by two parallel guide rails.

U.S. Pat. No. 4,646,182 to Sakurai (Feb. 24, 1987), discusses a carriage assembly for a magnetic disk apparatus. This apparatus includes a carriage which rides on two parallel guide rods on some bearing means. Also included is an elastic member between the carriage bearing means so that if the rods are not parallel, any deviation can be absorbed by elastic deformation.

U.S. Pat. No. 4,427,905 to Sutton (Jan. 24, 1984), discusses a carriage assembly for a magnetic data storage system. The carriage travels on two parallel support rods and the assembly is designed so that the center of gravity of the carriage assembly is approximately aligned with the center of force used to translate the carriage assembly on the support rods.

As indicated above, the performance requirements for magnetic systems are less than those for optical systems because the track width and bit size in optical systems is substantially less. Therefore, amounts of actuator assembly inaccuracy and jitter acceptable for magnetic systems are too great for optical systems. Because of the smaller bit size, a much higher tracking accuracy is needed in an optical system. This higher tracking accuracy can be achieved by providing a higher bandwidth (the frequency at which the transfer function is equal to one) in the tracking loop, i.e. the feedback system for positioning the actuator with respect to the information track in the disk. Known one-stage tracking systems have achieved bandwidths only up to about 500 hertz. The present apparatus can achieve a bandwidth of up to about 2 khz and up to 3 khz if no major phasenegative resonances occur below 10 khz.

Moreover, optical systems have several design requirements not associated with magnetic systems. For example, optical systems include a lens on the actuator for focusing the laser beam on the optical disk. Additionally, optical systems require an apparatus for moving the lens for its focusing function. Actuators in optical systems must also be designed to allow a path for light to travel from a light source to the lens.

Some optical information systems include two-stage radial movement mechanisms for transporting a lens with respect to a disk. The first stage controls the large, slow movements of the actuator (so-called "coarse tracking") and the second stage controls the fast, fine movement of the objective on the actuator (so-called "fine tracking"). While these systems can be highly accurate, they are relatively expensive to build and complicated to construct because they have two separate radial transport mechanisms.

Other optical systems have one-stage radial movement. For example, U.S. Pat. No. 4,443,721 to Jansen (Apr. 17, 1984), describes a device for translating an objective in which the assembly is supported on two parallel guide rods which are magnetizable and which form part of the stator yoke.

U.S. Pat. No. 4,545,046 to Jansen, et al. (Oct. 1, 1985), discusses an optical recording device including an optoelectronic system for converting the reflected optical beam into an electrical modulation in which the optoelectronic system is stationarily positioned with respect to the parallel guide rods on which the slide is translated.

Jansen, U.S. Pat. No. 4,607,913 (Aug. 26, 1986) describes an electrodynamic device for translating a lens in an optical disk system. This device includes a pair of radial drive coils for the slide and a pair of radial drive coils for the objective which are dimensioned to apply radial forces to the slide and objective which are proportional to their respective masses.

Some optical information systems, known as magneto-optic systems, store magnetic information on a disk which can be written and read optically. Such systems typically have a strong magnet for writing magnetic information to the disk which is positioned above the focusing lens which focuses an optical beam on the information disk. A problem with such systems is that this magnet can interfere with electromagnetic mechanisms for focusing the lens and translating the actuator.

While devices are known for achieving radial movement of a lens in optical disk systems, there is a need for actuator carriages having improved stability to allow for higher-frequency movement of focusing lenses. Improved stability allows for higher acceleration to reduce access time and for more accurate positioning so that one-stage systems can be used. There is also a need for lens-positioning devices for optical information systems which can be used in magneto-optic systems without substantial interference to electromagnetic lens focusing systems.

SUMMARY OF THE INVENTION

The present invention involves an actuator assembly for processing information on an optical disk having improved performance characteristics. The actuator assembly includes an actuator body, a radial drive assembly, and a focus assembly. An optical beam is generated from an optical source with the beam having an axis approximately parallel to a slide rail on which the actuator body rides. The radial drive assembly drives the actuator body along the rail. The optical beam is reflected by a 45 degree mirror on the actuator body and focused on an optical disk by a focus lens of the focus assembly.

The actuator body includes an actuator frame which defines a longitudinal rail channel, an optical channel, and inner pole spaces. The approximate center of mass of the actuator body is positioned above (i.e. in a direction towards the lens) the friction vector associated with movement of actuator body along the slide rail. The optical channel is approximately parallel to the rail channel and allows an optical beam to reach the focus assembly. The inner pole spaces provide space for inner pole pieces to be received through a radial coil which is an element of the radial drive assembly and is wrapped around the actuator frame.

The radial drive assembly of the invention imparts a radial force on the actuator body. The radial force vector is either substantially coincident with the center of mass of the actuator or displaced from the center of mass in the direction of the focus lens. The radial drive assembly includes a radial coil and a power source for flowing a current through the coil to create a magnetic field. The radial force on the actuator body is created by interaction between the magnetic field created by the radial coil and a magnetic field from stationary permanent magnets which are connected to outer pole pieces. Inner pole pieces for providing a return path for the magnetic flux are positioned inside the radial coil and are attached to the outer pole pieces.

The actuator body is almost entirely supported on the rail by bushings attached at ends of the rail channel. To keep the actuator body from rotating around the rail, a small rotational force or preload is imparted to the actuator body which is opposed by a slide surface on the actuator body positioned so that the slide surface rests on a stationary surface to maintain the actuator body in an upright position.

DETAILED DESCRIPTION

The present invention includes a linear actuator assembly for use in optical disk systems. An actuator body is provided for radial movement with respect to a rotating optical disk. A light source generates a laser beam which is reflected by a 45 degree angle mirror positioned on the actuator body toward the optical disk through a lens. A focus assembly focuses the light beam on the optical disk. The focus assembly moves the lens with respect to the optical disk to focus the light beam. A radial drive assembly is provided for moving the actuator body radially with respect to the optical disk on a slide rail.

Figure 1:
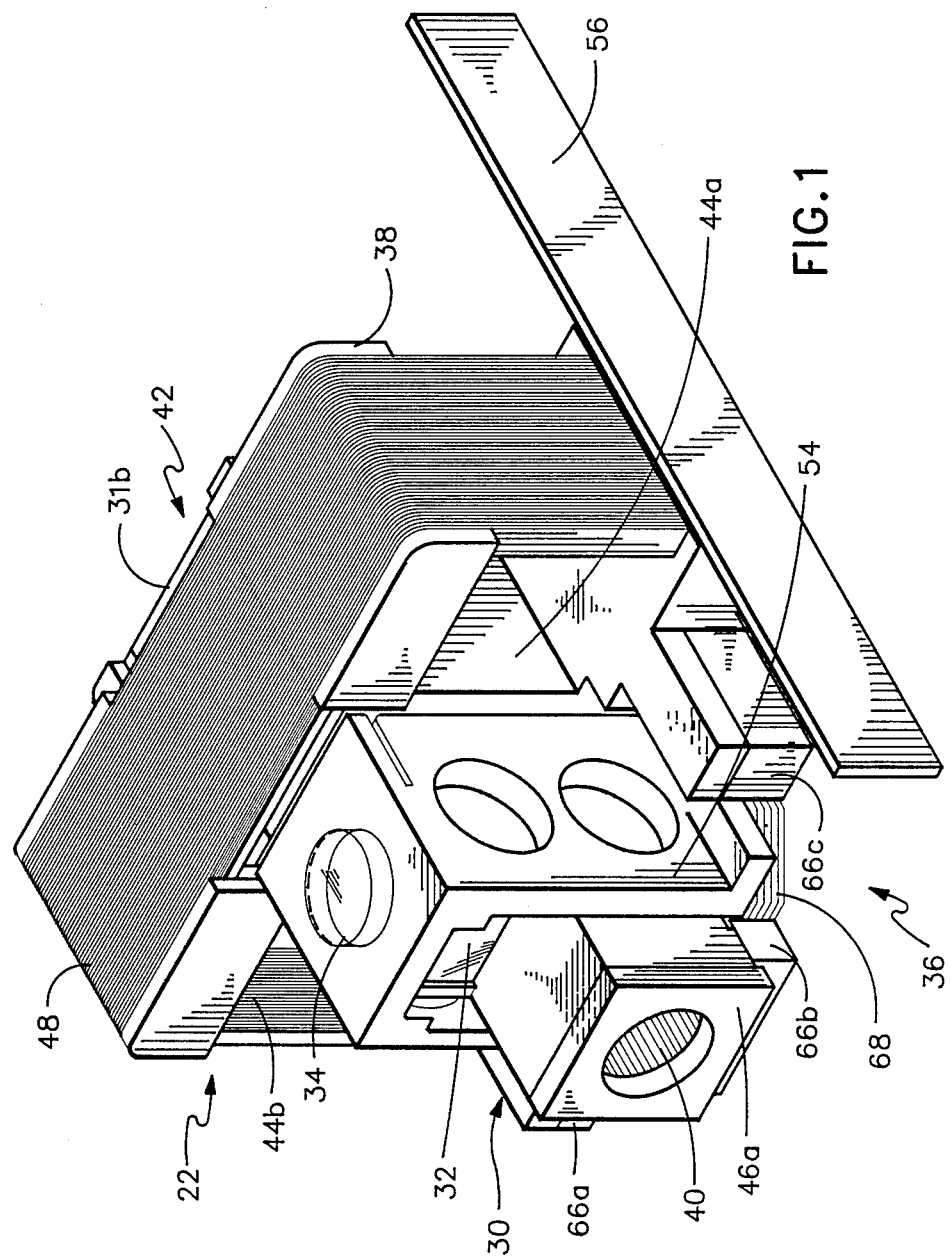
FIG. 1 is a perspective view of the actuator body, radial coil, and focus assembly according to the present invention.
Figure 2:
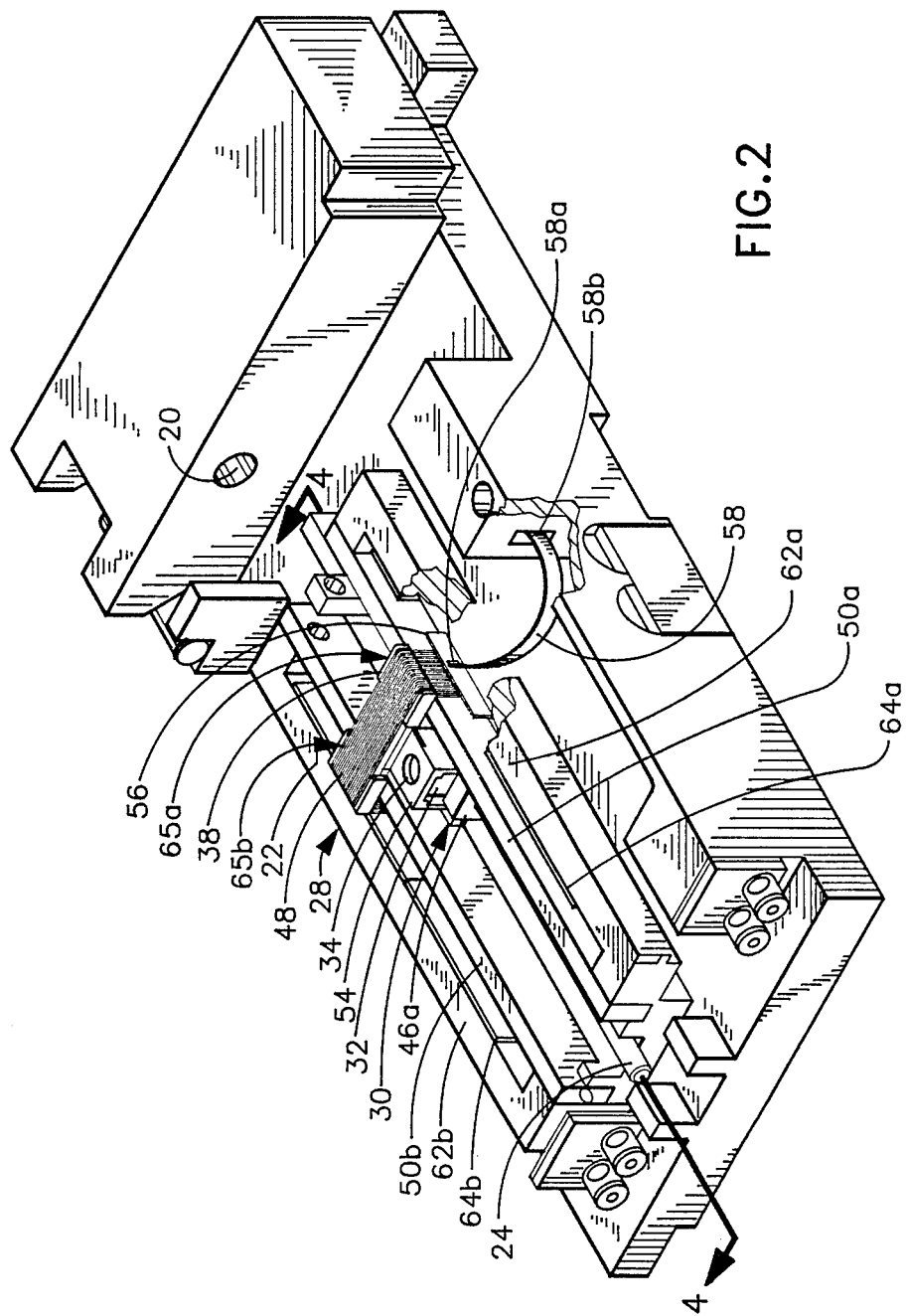
FIG. 2 is a perspective view of apparatus of the present invention including the actuator body, the radial drive assembly, the focus assembly, and a slide rail with a portion, cut away to show the flexfoil.
Figure 4:
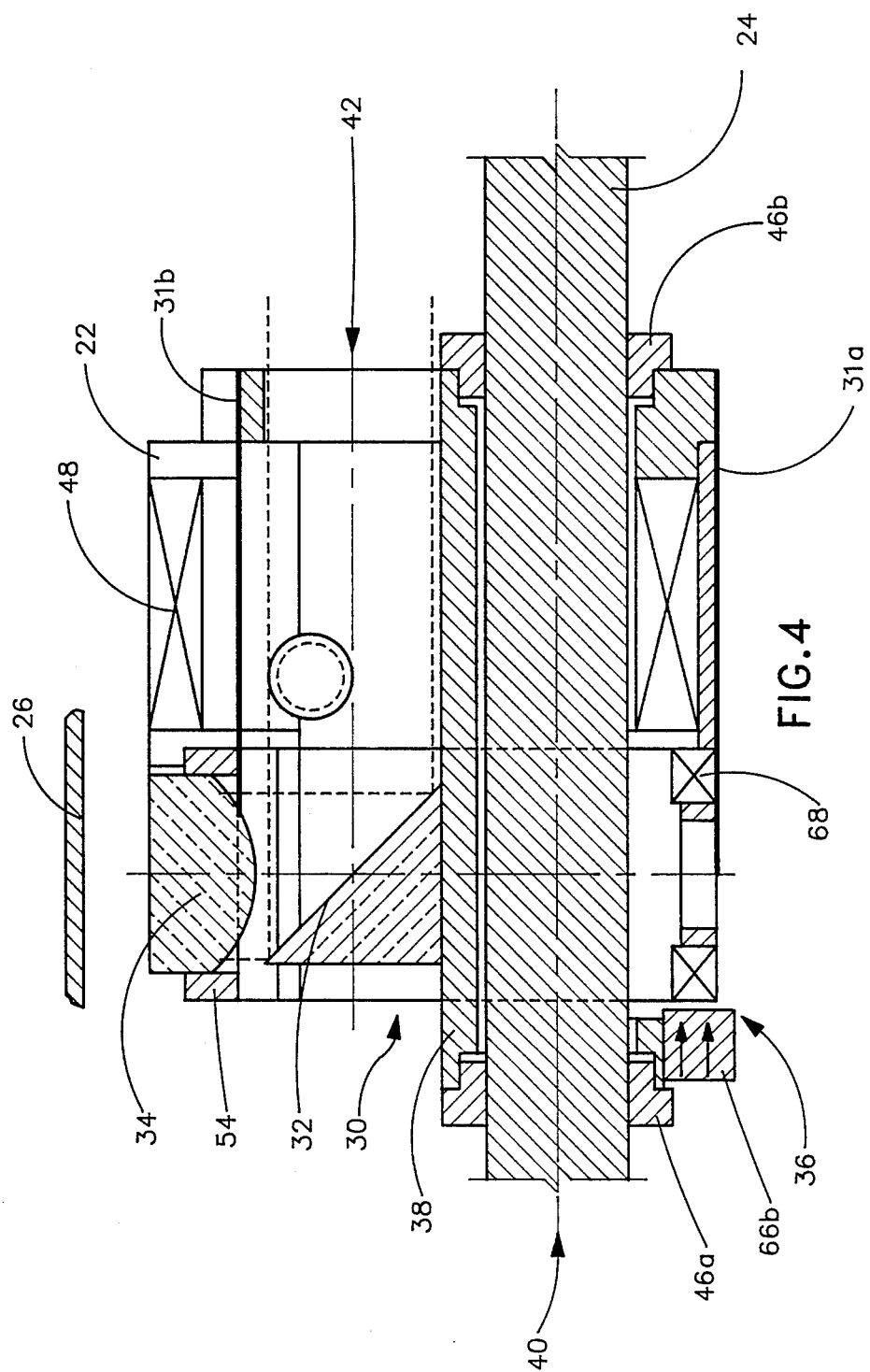
FIG. 4 shows a side cross-section view of the present invention taken along line 4—4 of FIG. 2 which illustrates the actuator body riding on a slide rail and an optical beam being reflected on a mirror and traveling through the lens to an optical disk.

With reference to FIG. 2, a preferred embodiment of the present invention is illustrated. An optical source 20 is illustrated and generates an optical beam, such as a collimated laser beam. The beam is transmitted to an actuator body 22 which travels on a slide rail 24. The optical beam is approximately parallel to the slide rail and is displaced with respect to the slide rail 24 in the direction of the optical disk 26, as seen in FIG. 4. The actuator body 22 is caused to move along the slide rail 24 by the radial drive assembly 28. In this manner, the actuator body 22 is positioned with respect to the optical disk 26 to access or write desired information at different positions on the disk 26. As seen in FIG. 4, the focus assembly 30 is attached to the actuator body 22 by two parallel focus flexures 31a, 31b and receives the light beam after it is reflected by a mirror 32 toward a lens 34, which is part of the focus assembly, in the direction of the optical disk 26. As seen in FIG. 1, the focus assembly 30 also includes a focus drive assembly 36 for positioning the lens 34 with respect to the optical disk 26. Referring to FIG. 4, the light beam is reflected by the optical disk 26 to the mirror 32 which directs the beam in a direction generally back towards the optical source 20, where it can interact with additional components, such as, a beam splitter (not shown) which separates the reflected light beam from the incoming light beam. The reflected light beam can then be sensed, for example, by a photodiode (not shown).

With reference to FIG. 1, the actuator body 22 is illustrated in detail. The actuator body 22 includes an actuator frame 38 which defines a rail channel 40, an optical channel 42, and first and second inner pole piece spaces 44a, 44b. The rail channel 40 is a longitudinal cavity configured such that the actuator frame 38 can be positioned on the slide rail 24, e.g., using bushings 46a, 46b so as to slide freely along the rail 24. The rail 24 is preferably round in cross section, but can be configured differently, such as square or triangular in cross section. The rail channel 40 is preferably round and sufficiently large in diameter to allow free movement of the actuator body 22 along the rail 24 without contact between the rail channel 40 and the rail 24. It should be recognized that the rail channel 40 can be configured differently. However, other configurations must allow free radial movement of the actuator body 22.

The actuator frame 38 also defines an optical channel 42. The optical channel 42 receives the optical beam generated by the optical source 20. Accordingly, the actuator frame 38 and other components of the present invention are positioned such that the optical beam has free entry to the optical channel 42 and is not obstructed. The optical beam generated by the optical source 20 passes through the optical channel 42 and hits the mirror 32. The optical channel 42 is approximately parallel to the rail channel 40 and is displaced from the rail channel 40 in the direction of the optical disk 26 and accordingly, in the direction of the lens 34.

The actuator frame 38 also defines inner pole piece spaces 44a, 44b. As seen in FIG. 1, the inner pole piece spaces 44a, 44b are positioned symmetrically on the actuator frame on either side of the slide rail channel 40. The actuator frame 38 defines three sides of the inner pole piece spaces 44a, 44b. The radial coil 48, which is a component of the radial drive assembly 28, defines the outer side of the inner pole piece spaces 44a, 44b. As discussed in more detail below, the inner pole piece spaces 44a, 44b allow stationary inner pole pieces 50a, 50b to be positioned inside of the radial coil 48. The inner pole pieces 50a, 50b are components of the radial drive assembly 28.

Also illustrated in FIGS. 1 and 4 are slide bushings 46a, 46b. Each of the bushings defines an approximately circular opening through which the slide rail 24 is positioned. The bushings 46a, 46b are attached to the actuator frame 38 in alignment with the rail channel 40. The smallest diameter dimension of the openings in the bushings 46a, 46b is smaller than the diameter of the slide rail channel 40. In this manner, as the bushings 46a, 46b are attached to the actuator frame 38, and the actuator is positioned on the slide rail 24 through the slide rail channel 40, the actuator frame 38 is supported on the slide rail 24 by the bushings 46a, 46b. Accordingly, the primary friction force resulting from movement of the actuator body 22 along the rail 24 occurs at the contact between the bushings 46a, 46b and the rail 24. As used herein, the term "friction vector" or "friction force vector" refers to the spatial location of the friction force and is typically the line defined by the contact points between the bushings 46a, 46b and the rail 24.

To provide improved stability and performance of the actuator body 22 and attached components at high frequencies, the present apparatus is designed so that the center of mass of the actuator body 22 and attached components is either substantially coincident with or above (i.e. in the direction towards the disk) the friction force vector associated with movement of the actuator body 22 along the slide rail 24, i.e. the center of mass is sufficiently close to being coincident that no substantial loss in stability or performance occurs from the center of mass being below the friction force vector.

The bushings 46a, 46b are attached to the actuator frame 38 by glue. The bushings 46a, 46b, however, can be attached by other means known in the art. For example, as shown in FIG. 9, various components of the present invention are joined by attachment pins 52.

Also attached to the actuator body 22 are upper and lower focus flexures 31a, 31b. The focus flexures 31a, 31b are attached to the actuator frame 38 and support the lens holder 54 of the focus assembly 30. The focus flexures 31a, 31b are flat springs which support the lens holder 54 at its top and bottom. The lower focus flexure 31a is positioned below the rail channel 40 and supports the bottom of the lens holder 54. The upper focus flexure 31b is positioned above the optical channel 42 and supports the top of the lens holder 54. The focus flexures 31a, 31b are approximately parallel to each other.

Placement of the focus flexures 31a, 31b above and below the optical channel 42 allows the center of mass of the actuator body 22 and attached components to be positioned much lower than in previous systems. This design provides a lower center of mass at least in part because the focus drive assembly 36 can be positioned below the optical channel 42.

Figure 9:
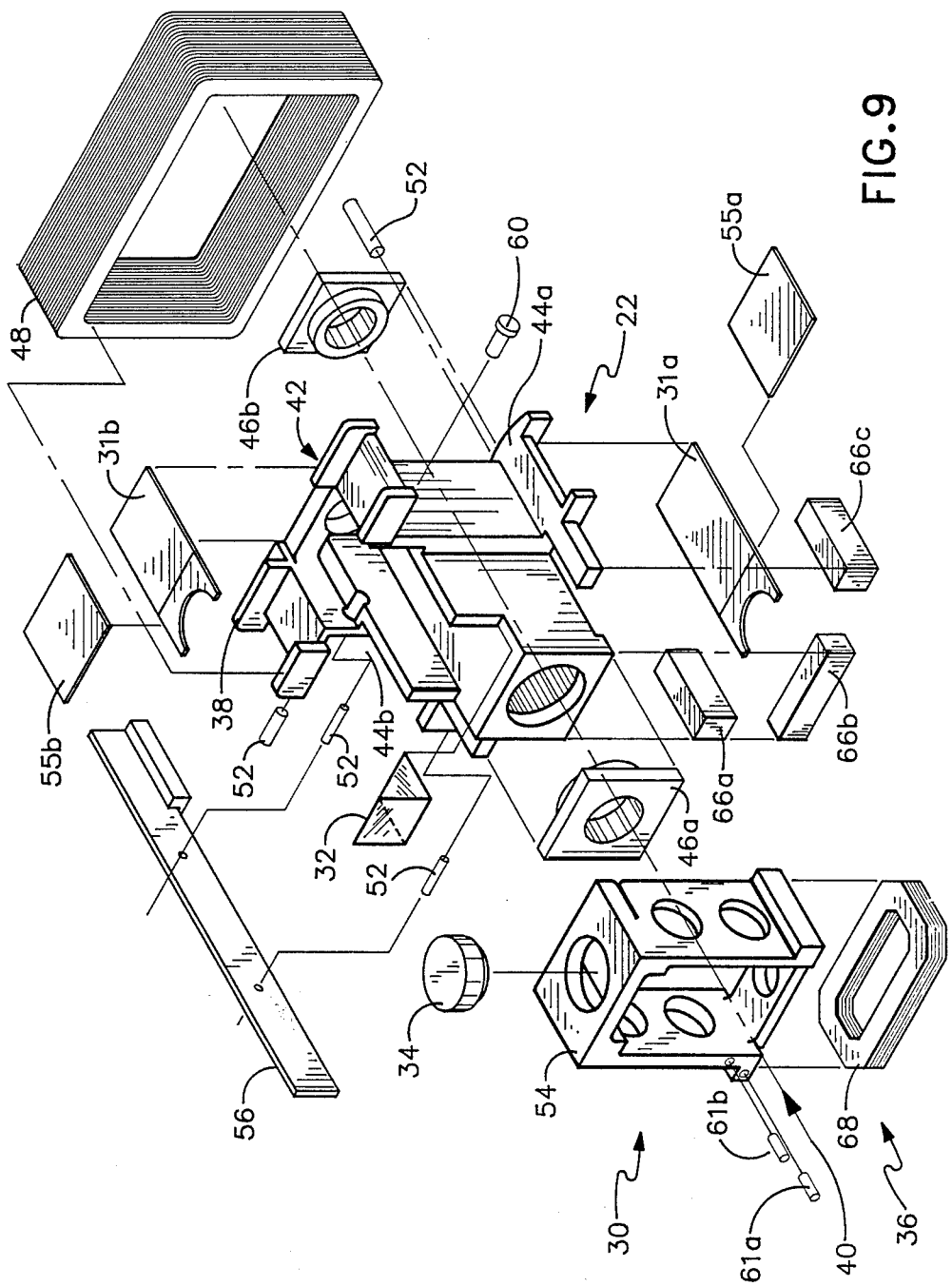
FIG. 9 is an exploded perspective view of the actuator body, radial coil, and focus assembly according to the present invention.

Also illustrated in FIG. 9 are damping tape pieces 55 a, b on the focus flexures 31a, 31b. The damping tape pieces are flexible pieces of tape which adhere to the focus flexures 31a, 31b to check or deaden spring-like movement of the flexures 31a, 31b.

Figure 3:
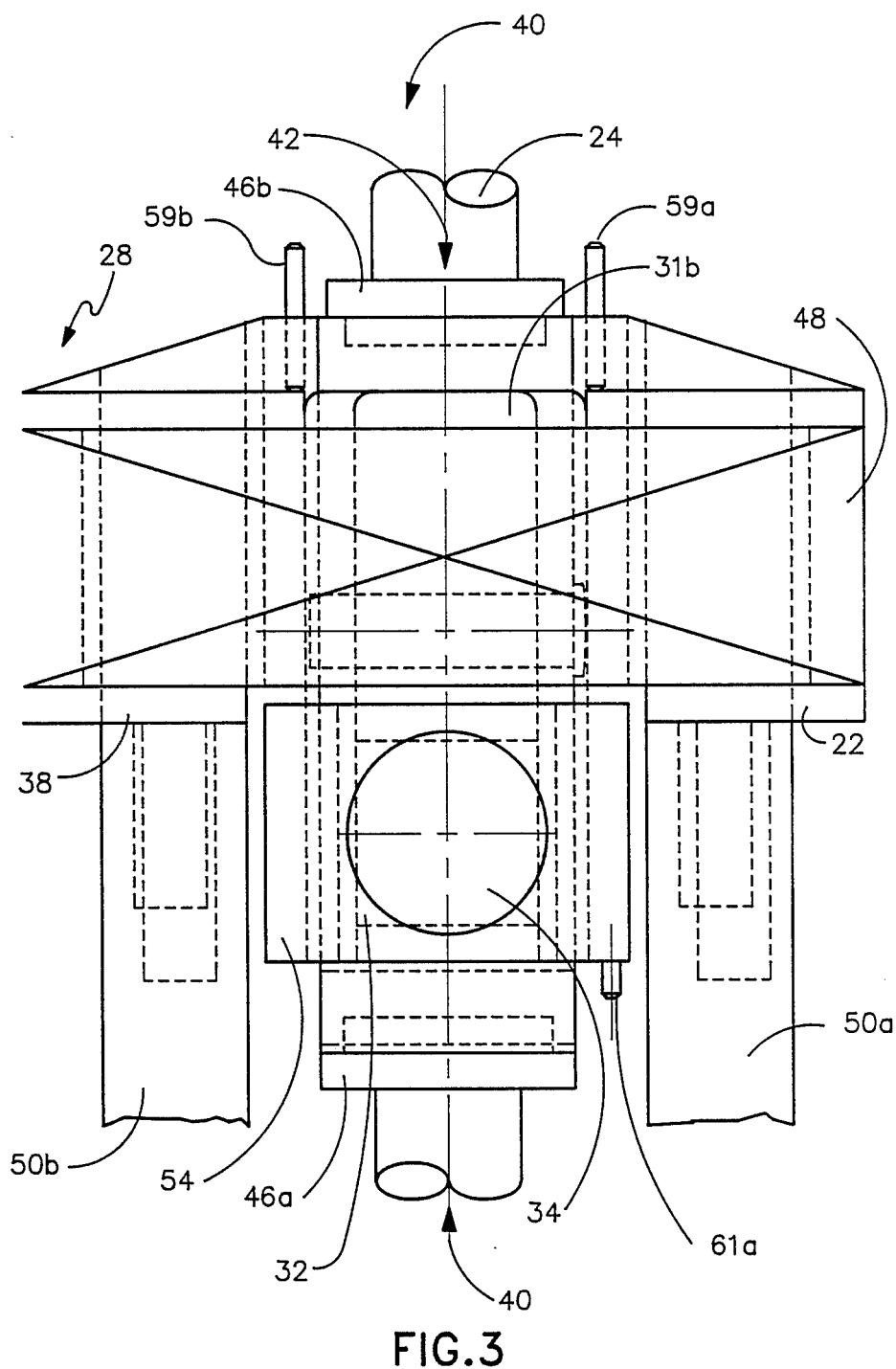
FIG. 3 is a top view of an apparatus according to the invention illustrating the actuator body and attached components riding on a slide rail.
Figure 5:
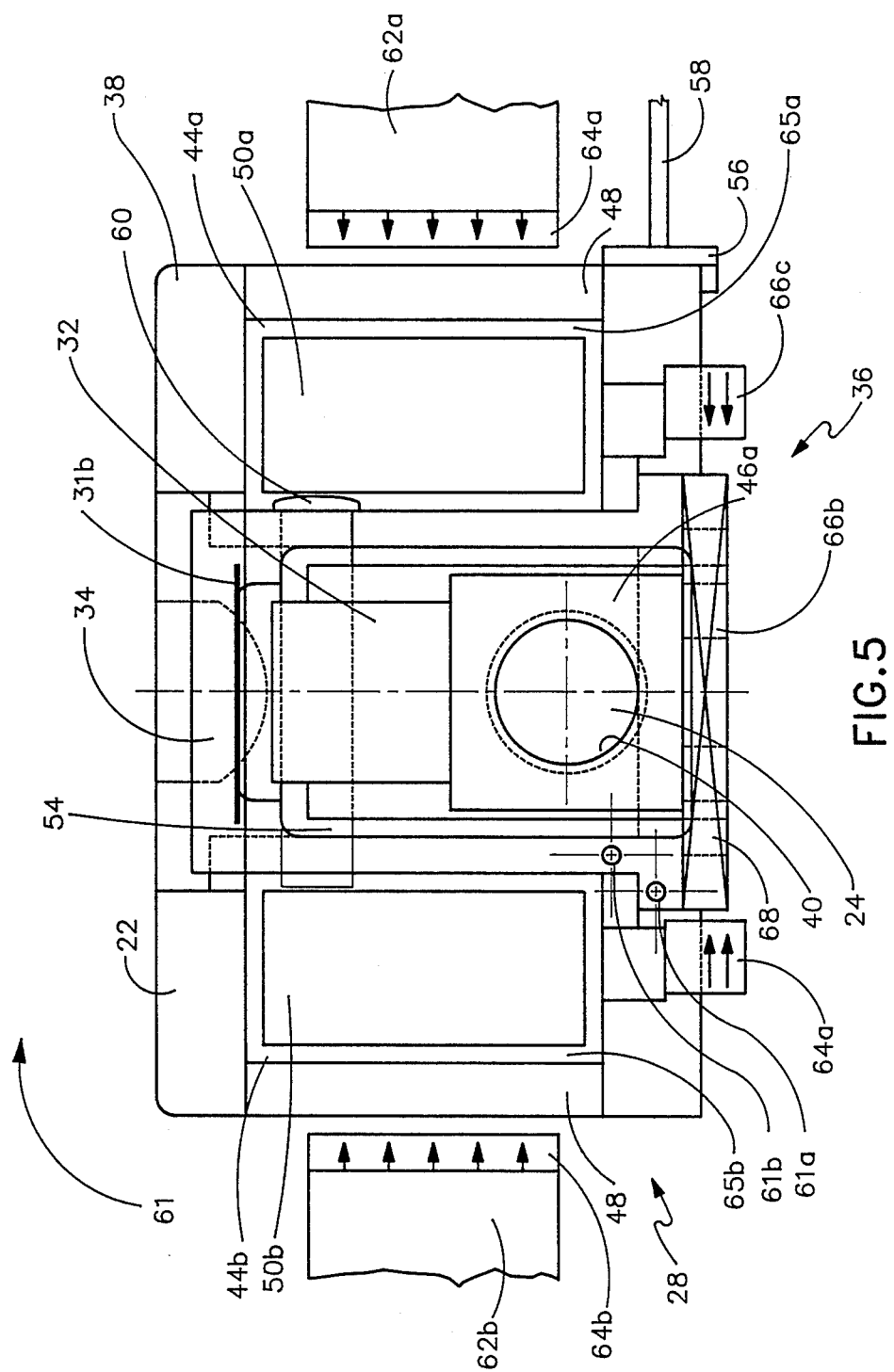
FIG. 5 shows a front view of the actuator body and illustrates the slide pin contacting the inner pole piece.

Also illustrated in FIG. 1 is a flexfoil support 56. The flexfoil support 56 is attached to the actuator frame 38 outside of the radial coil 48 which encircles most of the actuator frame 38. As seen in FIG. 2, a flexfoil 58 is provided for supplying electric current to the radial coil 48 and the focus assembly 30 from a current source (not shown). As seen in FIGS. 3 and 5, radial coil termination pins 59a, 59b and focus coil termination pins 61a, 61b are provided. Each end of the radial and focus coils is attached to a termination pin. The flexfoil 58 is electrically connected to the termination pins, e.g. by soldered connections (not shown). Current going into the coils goes through one termination pin, through the coil, through the other termination pin, and returns to the current source through the flexfoil 58. The flexfoil 58 is made of electrically conductive material and is electrically connected to the stationary current source at a first end 58b. A second portion 58a of the flexfoil is attached to the flexfoil support 56 and moves in a radial direction with the actuator body 22. To accommodate such movement, the flexfoil 58 is made of a flexible material of sufficient length to accommodate a full radial stroke of the actuator body 22. Electric current can be provided to the radial coil 48 by other means than the flexfoil 58. For example, flexible wires (not shown) can be used for carrying electric current to and from the radial coil 48.

Referring to FIG. 5, a slide surface 60 is attached to or formed in the actuator frame 38 and positioned within one of the inner pole piece spaces 44a, 44b. In operation of the present invention, a preload is imposed on the actuator body 22 (as described below) imparting a small rotational force about the slide rail 24. For example in FIG. 5, a clockwise rotation about the rail 40 is illustrated by an arrow 61. The preload causes the actuator body 22 to be rotated so that the slide surface 60 contacts an inner pole piece 50a, as shown in FIG. 5. In FIG. 5, the preload is provided by a spring-like urging of the flexfoil 58. In this manner, while almost all of the weight of the actuator body 22 and attached components bears on the bushings 46a, 46b which contact the slide rail 24, the slide surface 60 contacts the inner pole piece 50b for purposes of maintaining the actuator body 22 in an upright centered position on the slide rail 24. It should be recognized however that the slide surface 60 can contact surfaces other than an inner pole piece 50a, 50b. For example, the slide surface 60 could be positioned below the actuator body 22 and extend into a slot in the base of the support for the actuator assembly (not shown).

The radial drive assembly 28 of the present invention includes the first and second inner pole pieces 50a, 50b, the first and second outer pole pieces 62a, 62b, the first and second permanent magnets 64a, 64b, and the radial coil 48. The radial drive assembly 28 is illustrated in FIG. 2. The magnets 64a, 64b, inner pole pieces 50a, 50b, and outer pole pieces 62a, 62b function on either side of the actuator body in a symmetric manner; however, for purposes of the present discussion, only one set of these components will be discussed. With reference to FIG. 2, the inner pole piece 50a is positioned in the inner pole piece space 44a. The outer pole piece 62a is an elongated U-shaped element which attaches to either end of the inner pole piece 50a at the two top parts of the U. The elongated bottom portion of the U is approximately parallel to the inner pole piece 50a and is outside of the inner pole piece space 44a. The magnet 64a is elongated and is attached to the elongated bottom portion of the U of the outer pole piece 62a on the surface of the U which opens toward the inner pole piece 50a. The magnet 64b causes a magnetic flux in an air gap 65a between the inner pole piece 50a and the outer pole piece 62a. This magnetic flux returns to the magnet 64a through the inner pole piece 50a, to the outer pole piece 62a to the back of the magnet 64a. The length of the magnets 64a, 64b, inner pole pieces 50a, 50b and outer pole pieces 62a, 62b must be at least as great as the radial distance which the actuator body 22 must travel to cover the entire radial distance of the readable and writable portions of the optical disk 26.

The magnets 64a, 64b cause strong magnetic fields in each of the air gaps 65a, 65b between the inner pole pieces 50a, 50b and the magnets 64a, 64b. According to the principle of Lorentz forces, when the actuator radial coil 48 positioned in these air gaps 65a, 65b is carrying a current, the coil 48 is subject to a force caused by interaction between the magnetic fields from the magnets 64a, 64b and a magnetic field created by electromagnetic induction through the coil 48. By correct orientation of the magnetic fields, the force on the coil 48, and consequently on the actuator body 22, is positioned in the radial direction along the rail 24. In this manner, the actuator body 22 is moved along the slide rail 24 for radial positioning. In particular, using well-known electromagnetic design principles, the shape, orientation and character of the magnets 64a, 64b, pole pieces 50a, 50b, 62a, 62b and coil 48 can be chosen to provide a desired location and orientation of the force vector. Changing the magnitude or direction of the current in the coil 48, and consequently the magnitude or polarity of the magnetic field created by the coil 48 results in changing the force imparted to the actuator body 22. By controlling the magnitude and direction of the force imparted on the actuator body 22, the body 22 can be accelerated or decelerated in either direction along the slide rail 24.

The radial drive assembly 28 of the present invention is constructed so that the force imparted to the actuator body 22 defines a resultant radial force vector which either is substantially coincident with the center of mass of the actuator body 22 and attached components or is displaced from the center of mass in the same direction that the lens 34 is displaced from the center of mass, but not further than the displacement of the lens 34, i.e. the center of mass is sufficiently close to being coincident that no substantial loss in stability or performance occurs from the radial force vector being displaced from the center of mass in a direction other than toward the lens 34. These configurations provide improved stability to the assembly at high frequencies, as described below. The position of the radial force vector is determined by the relative positions of the radial coil 48 and the stationary magnets 64a, 64b. The radial force vector created by the radial drive assembly 28 passes through a point approximately coincident with the center of the radial coil 48 when the magnets 64a, 64b are symmetrically positioned with respect to the radial coil 48.

Referring to FIG. 4, the focus assembly of the present invention includes a focus drive assembly 36, a lens 34, and a lens holder 54. The mirror 32 is fixedly attached to the actuator body 22 and is positioned with respect to the actuator body 22 in alignment with the optical channel 26. In this manner, the mirror 32 receives the optical beam generated by the optical source 20 and reflects it toward the lens 34 of the focus assembly. The mirror is positioned at a 45 degree angle with respect to the optical channel 42 so that the incoming optical beam which is parallel to the optical channel 42 and the slide rail 24 is reflected at a 90 degree angle toward the optical disk 26 and away from the rail channel 40. In such a configuration, the mirror 32 reflects the optical beam toward the optical disk 26 regardless of the position of the actuator body 22 on the slide rail 24.

The lens holder 54 is also attached to the actuator body 22 by the focus flexures 31a, 31b. However, the lens holder moves with respect to the actuator body in a direction perpendicular to the radial movement of the actuator body 22 along the slide rail 24. This direction of movement of the lens holder 54 is about parallel to the direction of the optical beam reflected from the mirror 32 toward the optical disk 26.

The lens holder 54 is configured to hold the lens 34 in a position so that the optical beam reflected from the mirror 32 is directed through the lens 34. Accordingly, as the lens holder 54 moves, the lens 34 is positioned by movement of the lens holder 54. This movement is perpendicular with respect to the radial direction of movement of the actuator body 22 along the slide rail 24 in the direction of the optical disk 26.

Referring to FIG. 1, the focus drive assembly 36 includes first, second and third focus magnets 66a, 66b, 66c and a focus coil 68. The focus magnets 66a, 66b, 66c are attached to the actuator body 22 in a fixed manner and create a magnetic field oriented in a direction approximately perpendicular to the direction of radial movement of the actuator body 22 along the slide rail 24, i.e., in the direction of the optical disk 26. The focus coil 68 is fixedly attached to the lens holder 54 and a magnetic field is created by electromagnetic induction by flowing a current through the focus coil 68. Accordingly, an electrical connection is provided between the flexfoil 58 and the focus coil 68. The flexfoil 58 thus carries two currents: a radial current and a focus current. Both the radial current and the focus current are provided by apparatus for providing focus and tracking signals using methods well known in the art. By changing the current through the focus coil 68, the direction and magnitude of magnetic field created by the focus coil 68 can be changed. In this manner, the interaction between the magnetic fields of the focus coil 68 and the focus magnets 66a, 66b, 66c is changed to effect movement of the lens holder 54 for focusing the optical beam on the optical disk 26.

The focus drive assembly of the preferred embodiment of the present invention includes focus magnets which are attached to the actuator body and a focus coil on the lens holder which is movable with respect to the actuator body. It should be recognized, however, that other designs fall within the scope of the invention. For example, the focus drive assembly can alternatively have the focus coil attached to the actuator body with the focus magnets attached to the lens holder. In such an embodiment, the focus magnets move with respect to the actuator body during focusing movement.

As discussed above, the primary weight-bearing force of the actuator body 22 and the attached components is on the bushings 46a, 46b which ride on the slide rail 24. A preload force is applied to the actuator body 22 to impart a small rotational force on the actuator body 22 around the slide rail 24 as depicted by the arrow 61 in FIG. 5. This force is opposed by the slide surface 60 which rides on an inner pole piece 50a. The preload force need only be strong enough to substantially maintain contact between the slide surface 60 and the surface which the slide surface 60 contacts. If the preload force is too strong, the friction created by contact between the slide surface 60 and the surface impairs the movement of the actuator body 22 on the slide rail 24. In one embodiment, the preload is created by positioning the focus magnets 66a, 66b, 66c on the actuator body 22 asymmetrically (not shown in Figures). In this manner, the magnetic interaction between the focus magnets 66a, 66b, 66c and the magnetic fields created by the permanent magnets 64a, 64b is not centered on the actuator body 22. Accordingly, the magnetic interaction will impart a rotational force on the actuator body 22 about the slide rail 24.

A preload can be provided in other manners. For instance, instead of asymmetric focus magnets, an additional magnet or piece of iron can be positioned on the actuator body 22 in a location such that the extra magnet or piece of iron is located asymmetrically with respect to the center of mass of the actuator body 22 and attached components. These embodiments alter the balance of magnetic forces acting upon the actuator body so that a small net rotational force results. Alternatively, a preload can be imparted to the actuator body 22 by a spring-like urging of the flexfoil 58 at its contact with the flexfoil support 56. The flexfoil 58 is made of a resiliant or spring-like material and, in the position depicted in FIG. 2, is in a stressed condition tending to urge the flexfoil support 56 in a direction away from the flexfoil 58.

The Figures illustrate an embodiment of the present invention in which the actuator body 22 is on the rail 24 in an upright position so that an incoming optical beam is deflected upward toward an optical disk 26. It should be recognized that the present invention can also include an actuator body 22 positioned differently with respect to the rail 24. For example, the actuator body 22 can be upside down in a system with an optical disk 26 positioned below the rail 24. Alternatively, the actuator can be positioned midway between the two positions described above. In this position, the optical disk 26 is positioned to one side of the actuator body 22.

As discussed above, an objective of optical disk systems is to achieve high frequencies of actuator assembly movement to access information in less time than is possible using lower frequencies. A recognized measure of the ability of the actuator in a system to achieve high frequency movement is the bandwidth associated with the transfer function of the actuator. The bandwidth of an actuator is limited by the occurrence of phase negative resonances. Previous known systems have only achieved bandwidths of up to about 500 hertz. Actuator assemblies designed in accordance with the principles discussed above can achieve radial transfer bandwidths of greater than 500 hertz, more preferably greater than 1 kilohertz, and most preferably equal to about 2 kilohertz. If no major phase negative resonances occur below 10 kilohertz, a bandwidth about equal to 3 kilohertz can be achieved. Above a frequency of 10 kilohertz, because of limited radial stiffness between the lens holder and the actuator body when using presently known and available materials, no radial forces can be transferred to the lens holder. Radial stiffness is determined at least in part by the radial stiffness of the focus flexures, the stiffness of the glue joints of the focus flexures with the lens holder and actuator body, and possibly some structural parts of the actuator body. Accordingly, the bandwidth could possibly be extended past about 3 kilohertz by improving the stiffness of the above-identified components.

At a frequency of about 2 kilohertz, resonances occur with the above-described device which are normally phase positive. These resonances are associated with the bearings system where friction forces act on the actuator. If the friction forces act on the actuator above its center of mass, then these forces will cause a negative phase shift at those bearing-associated resonances of about 2 kilohertz. If the friction forces act on the actuator substantially coincident with or below its center of mass, those resonances are phase positive. Phase positive resonances do not cause instability in the tracking loop and a bandwidth of up to about 3 kilohertz can be achieved. Therefore, the present invention includes providing apparatus and methods such that the friction forces do not act on the actuator substantially above its center of mass.

A linear actuator assembly provided in accordance with the above discussion provides advantages for optical information systems and is simple in design which minimizes construction costs. By virtue of the use of a single rail, problems associated with two rail systems, such as jamming or jittering of the actuator at high frequencies, are avoided. The present design is well balanced and highly stable. Accordingly, it can withstand high radial and focus accelerations, as well as high frequencies. Larger bandwidths can be achieved which allow for improved response times for focus and radial movement.

The present actuator assembly is also useful for magneto-optic systems without interference with the focus or radial assembly. The magnetic components of the focus assembly are located near the portion of the lens holder furthest away from the information surface. Accordingly, the likelihood of magnetic interference from the magnet for writing information on the disk is reduced.

Figures 6A, 6B:
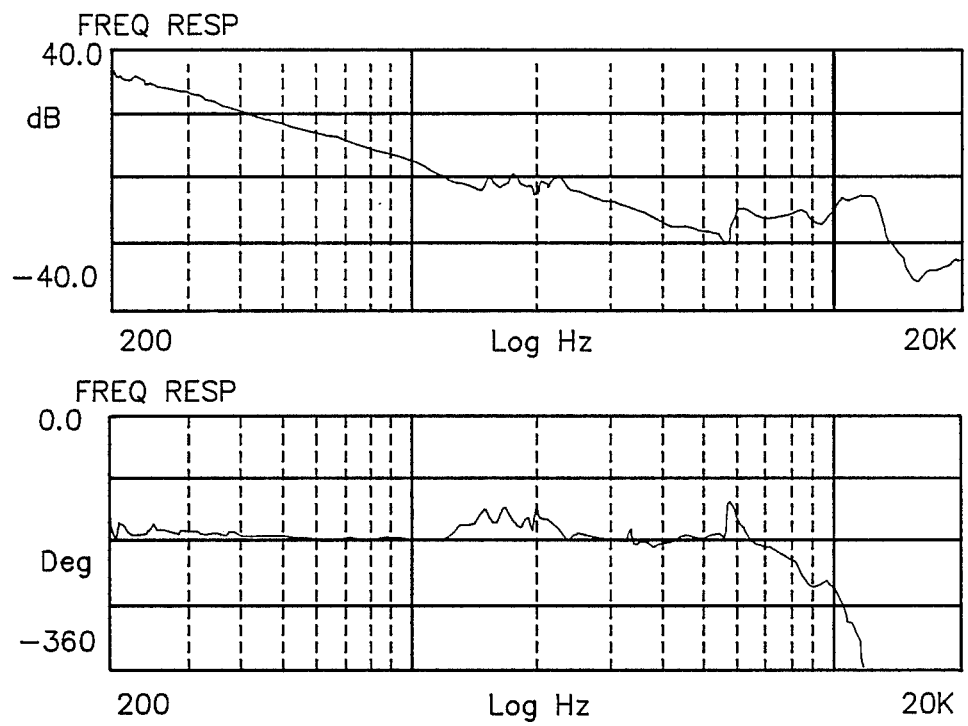
FIGS. 6A and 6B are Bode plots for the radial transfer performance of an actuator assembly designed in accord with the present invention when the actuator is in an upright position.
Figures 7A, 7B:
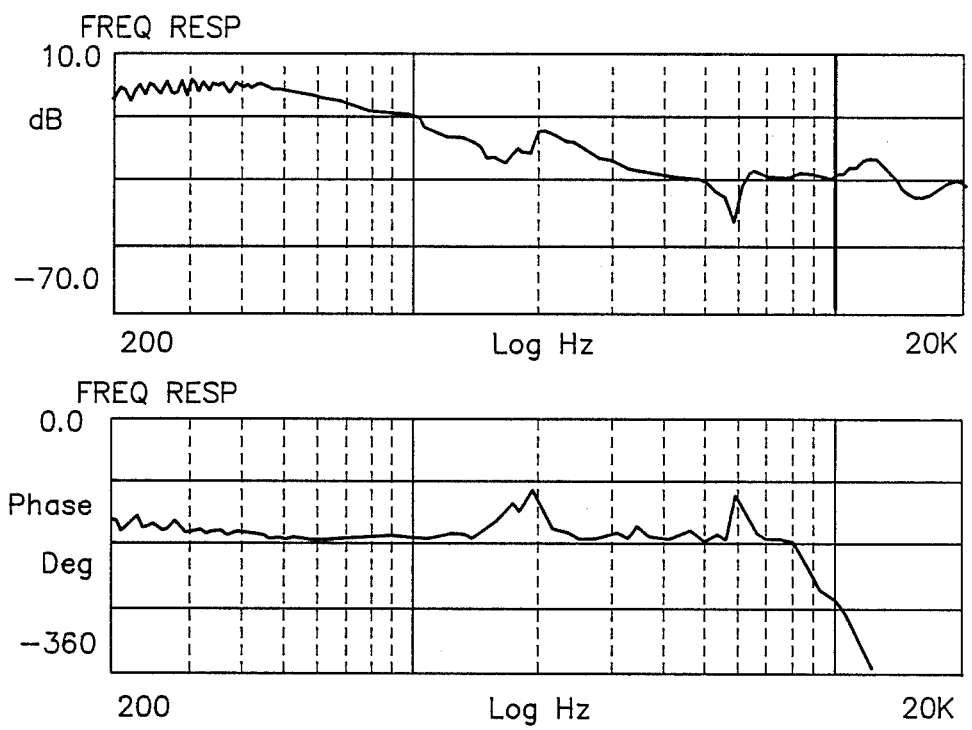
FIGS. 7A and 7B are Bode plots for the radial transfer performance of an actuator assembly designed in accord with the present invention when the actuator is rotated around a horizontal slide rail ninety degrees.
Figures 8A, 8B:
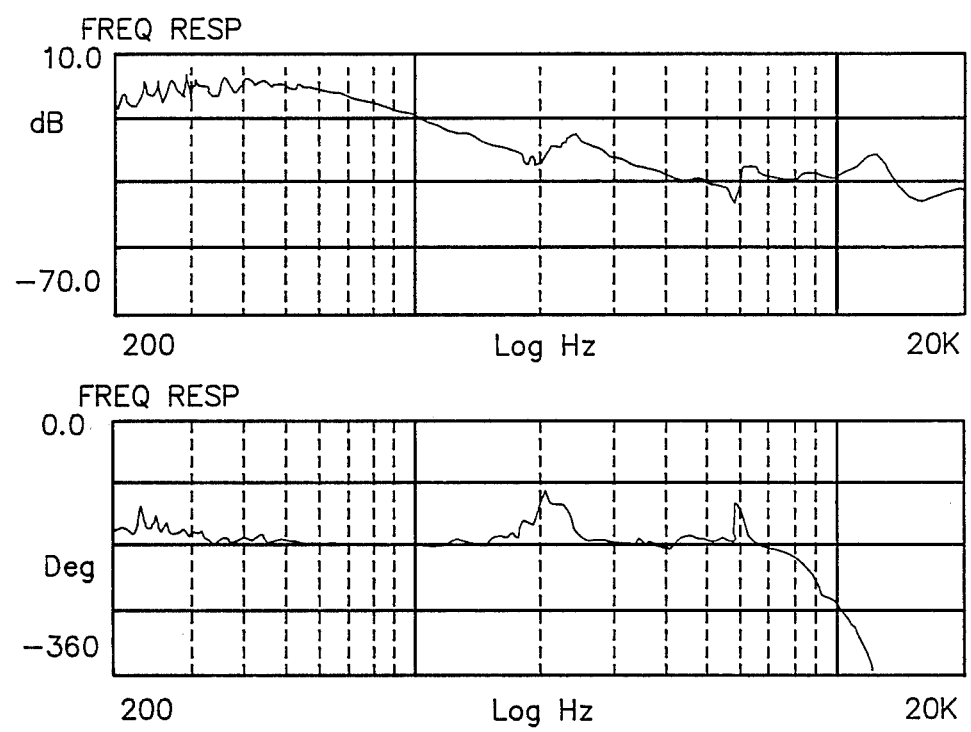
FIGS. 8A and 8B are Bode plots for the radial transfer performance of an actuator assembly designed in accord with the present invention when the actuator is in an upside down position.

FIGS. 6, 7 and 8 depict Bode plots for the radial performance of an actuator assembly designed in accord with the present invention and depicted in FIGS. 1-5. Bode plots are pairs of graphs which illustrate the radial frequency response of a system. One graph of each pair 6A, 7A, 8A is a plot of frequency versus the ratio of the changes in output to input signal magnitude (shown as decibels (dB)) and the other graph of each pair 6B, 7B, 8B is a plot of frequency versus phase shift between input and output signals.

FIG. 6 shows the Bode plots for operation of the actuator assembly along a horizontal axis in which position an optical disk would be positioned above the actuator. FIG. 7 shows the Bode plots for operation of the actuator assembly along a horizontal axis during which the actuator assembly is rotated approximately 90° from the position corresponding to FIG. 6. FIG. 8 shows the Bode plots for operation of the actuator assembly along a horizontal axis in which position an optical disk would be positioned below the actuator.

As is evident from the transfer function of the present apparatus, as depicted in FIGS. 6-8, a bandwidth of at least about 2 kilohertz is achieved. If the phase shift of the transfer function is maintained positive, a bandwidth of about 3 kilohertz can be achieved. As seen in FIGS. 6-8, operation of the actuator in different positions does not substantially affect the performance of the device.

While various embodiments of the present invention have been described in detail, it is apparent that modifications and adaptations of those embodiments will occur to those skilled in the art. However, it is expressly understood that such modifications and adaptations are within the scope of the present invention, as set forth in the following claims.

What is claimed is:

1. An actuator assembly for use in an optical disk information processing system comprising:
   (a) an actuator body, said body defining a first channel and having a center of mass;
   (b) a slide rail, said rail passing through said first channel;
   (c) means for focusing an incoming optical beam onto said optical disk, said focusing means including a lens, said lens being displaced from said center of mass in a first direction; and
   (d) means for applying a motive force to said body along a first line approximately parallel to said first channel, said line being substantially coincident with or displaced from said center of mass in said first direction.

2. An actuator assembly, as claimed in claim 1, wherein said means for applying a motive force comprises a radial coil defining a center and wound around said body so that said center of said coil is substantially aligned with said first line.

3. An actuator assembly, as claimed in claim 1, wherein said body further defines first and second inner pole cavities on opposite sides of said first channel, wherein said means for applying a motive force further comprises first and second stationary inner pole pieces, first and second stationary outer pole pieces, and first and second stationary permanent magnets, wherein said first and second inner pole pieces are positioned, respectively, through said first and second inner pole cavities, wherein said first and second outer pole pieces are connected, respectively, to said first and second inner pole pieces and said first and second outer pole pieces are positioned outside of said inner pole cavities, and wherein said first and second permanent magnets contact said first and second outer pole pieces, are between said first and second outer pole pieces and said actuator body, and are positioned symmetrically with respect to said radial coil.

4. An actuator assembly, as claimed in claim 1, further comprising means for preventing rotation of said body around said rail.

5. An actuator assembly, as claimed in claim 4, wherein said means for preventing rotation comprises means for imparting a one-directional rotational force around said rail on said body and means for opposing said rotational force.

6. An actuator assembly, as claimed in claim 5, wherein said means for imparting comprises a magnet positioned assymetrically on said body with respect to said center of mass.

7. An actuator assembly, as claimed in claim 5, wherein said means for imparting comprises a spring-like flexfoil.

8. An actuator assembly, as claimed in claim 5, wherein said means for imparting comprises a piece of iron positioned on the actuator body asymmetrically on said body with respect to said center of mass.

9. An actuator assembly, as claimed in claim 5, wherein said means for opposing comprises a slide surface for contacting a stationary surface.

10. An actuator assembly, as claimed in claim 1, wherein said focusing means comprises two focus supports, wherein said body defines a second channel for passage of said optical beam, and wherein said first and second channels are between said focus supports.

11. An actuator assembly, as claimed in claim 1, wherein said focusing means further comprises a focus coil and at least one focus magnet and wherein said focus coil and said focus magnet are displaced from said longitudinal axis in a second direction approximately opposite said first direction.

12. An actuator assembly for processing information on an optical disk, comprising:
   (a) an actuator body having a center of mass, said body defining a first channel for engaging an actuator assembly rail and a second channel parallel to said first channel;
   (b) means for focusing an incoming optical beam onto said optical disk, said focusing means including a lens, said lens being positioned opposite said first channel with respect to said second channel and said focusing means further including two focus supports wherein said first and second channels are between said focus supports;
   (c) means for applying a motive force to said actuator body in a first line approximately parallel to said first channel to move said actuator body along said rail, said line being substantially coincident with or displaced from said center of mass in the direction of said lens, wherein, upon movement of said body along said rail, a friction force vector associated with contact between said first channel and said rail is displaced from said center of mass in a direction substantially away from said lens, and wherein said means for applying a motive force comprises a radial coil defining a center and wound around said body so that said center of said coil is substantially aligned with said first line; and
   (d) means for preventing rotation of said body around said rail.

13. An apparatus, as claimed in claim 12, wherein said focusing means further comprises a focus coil and a focus coil magnet positioned opposite said second channel with respect to said first channel.

14. An actuator body, as claimed in claim 12, wherein said means for applying a motive force further comprises a radial coil around said frame, wherein said first and second channels pass through said radial coil.

15. An actuator assembly for use in an optical disk information processing system, comprising:
   (a) an actuator having a center of mass, wherein said actuator defines a first channel and is supported by a single rail passing through said first channel;
   (b) a lens for focusing a reflected incoming optical beam toward an optical disk, said lens being displaced from said center of mass in a first direction;
   (c) means for applying a motive force to said actuator along a line approximately parallel to said first channel, said line being substantially coincident with or displaced from said center of mass in said first direction; and
   (d) wherein said actuator has a radial transfer frequency bandwidth of at least about 500 hertz.

16. An actuator assembly, as claimed in claim 15, wherein said actuator has a radial transfer frequency bandwidth about equal to 2 kilohertz.

17. An actuator assembly, as claimed in claim 15, wherein a friction force vector associated with movement of said actuator assembly on said rail is below center of mass and wherein said actuator has a radial transfer frequency bandwidth about equal to 3 kilohertz.

18. A process for focusing an optical beam in an optical disk system, comprising:
   (a) providing an actuator and rail assembly, said actuator defining a first channel about an actuator longitudinal axis, said actuator having a center of mass and said rail passing through said first channel;
   (b) applying a motive force to said actuator centered along a first line approximately parallel to said first channel, said first line being substantially coincident with or displaced from said center of mass in a first direction, to position said actuator radially with respect to said optical disk; and
   (c) focusing an incoming optical beam onto said optical disk, using a lens which is displaced from said center of mass in said first direction.

19. A process, as claimed in claim 18, wherein a friction force vector associated with movement of said actuator along said rail is below said center of mass.

20. A process, as claimed in claim 18, further comprising preventing rotation of said actuator around said rail.

21. A process, as claimed in claim 20, wherein said step of preventing rotation comprises imparting a one directional rotational force around said rail on said actuator and opposing said rotational force.

22. A process for focusing an optical beam in an optical disk system, comprising:
   (a) providing an actuator and rail assembly, said actuator defining a first channel about an actuator longitudinal axis, said rail passing through said first channel, said actuator having a center of mass and wherein a friction force vector associated with movement of said actuator along said rail is below said center of mass;
   (b) applying a motive force to said actuator along a first line approximately parallel to said first channel, said first line being substantially coincident with or displaced from said center of mass in a first direction, to position said actuator radially with respect to said optical disk;
   (c) focusing an incoming optical beam onto said optical disk, using a lens which is displaced from said center of mass in said first direction; and
   (d) imparting a one-directional rotational force around said rail on said actuator and opposing said rotational force to prevent rotation of said actuator around said rail.

23. A process, as claimed in claim 22, wherein said actuator has a radial transfer frequency bandwidth about equal to 3 kilohertz.

* * * * *